…

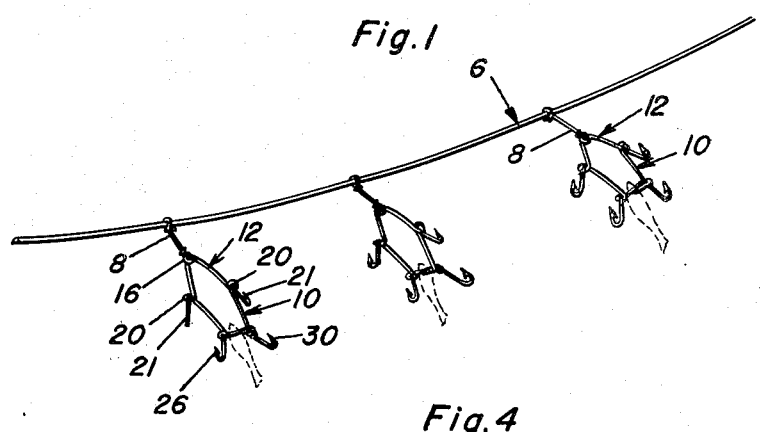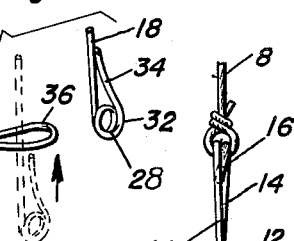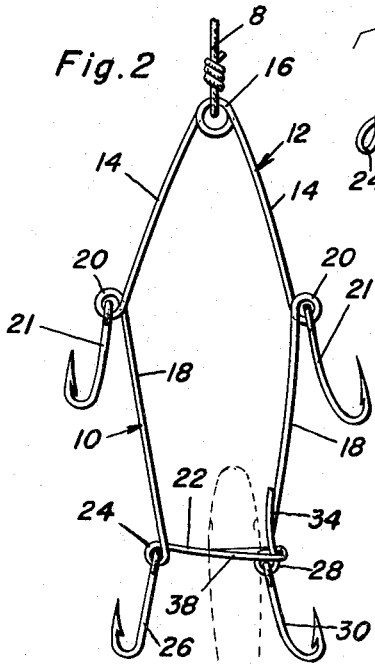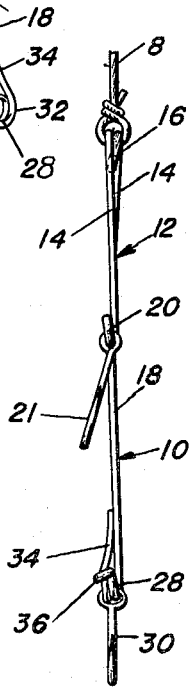

United States Patent Office 2,996,827
Patented Aug. 22, 1961

2,996,827
BAIT AND FISHHOOK HOLDER
James E. Allen and Allee M. Allen, both of Box 574, Thayer, Mo.
Filed Jan. 4, 1960, Ser. No. 319
3 Claims. (Cl. 43—42.74)

This invention relates to an improved bait and fishhook holder expressly designed and adapted for attachment to and suspension from a trotline.

The invention is highly adaptable and suitable for use when used in conjunction with a suitable attaching or tie line which enables it to be attached to and staged in position on a trotline.

In carrying out the invention a simple and expedient frame is provided. This frame is made from a length of wire which is bent upon itself between its ends to provide a lower U-shaped portion and an upper V-shaped portion, the components of said portions having spaced eyes and said eyes serving to permit the attachment thereto of a plurality of fish hooks. The fish hooks are suspended from the group of eyes so that there is little likelihood of the hooks colliding with each other.

A significant improvement resides in the manner in which the bight portion of the U-shaped part is constructed whereby it, in its specially designed form, serves not only as a latch but also as a bait clamp or holder.

These together with other objects and advantages which will become subsequently apparent reside in the details of construction and operation as more fully hereinafter described and claimed, reference being had to the accompanying drawing forming a part hereof, wherein like numerals refer to like parts throughout, and in which:

FIG. 1 is a view in perspective showing a fragmentary portion of a trotline and showing several of the fish spreaders attached thereto and thus staged in position thereon;

FIG. 2 is a plan view of a spreader on an enlarged scale;

FIG. 3 is an edge view of the same; and

FIG. 4 is a fragmentary perspective view showing the latch and keeper.

It is to be pointed out that while the device is highly and satisfactorily usable when hung from a trotline it is the construction of the device itself which is the most significant aspect of the invention.

In FIG. 1 the trotline, which is conventional, is denoted by the numeral 6 and the various spreaders are attached thereto by way of auxiliary tie lines 8 sometimes referred to as staging lines.

With reference now to FIGS. 2 to 4, inclusive, the essence of the concept may be more clearly seen. The over-all unit is an elongated open wire frame with facilities for attaching and suspending a plurality of fish hooks and, if desired, for assisting in clamping a bait, such as a minnow thereon.

The frame is preferably formed from a single length of bendable wire of suitable gauge and rigidity. The frame is elongated and is characterized at the bottom (in relation to the views of the drawing) by a substantially U-shaped component 10 and at the top by an inverted V-shaped complemental component 12. The latter includes downwardly diverging limbs 14 joined at the converging ends by a coiled eye 16 to which the line 8 is tied. The U-shaped part or component 10 comprises a pair of companion limbs 18 the upper ends of which are joined to the lower ends of the limbs 14 by way of connecting coils or eyes 20. These eyes 20 serve to support fish hooks 21. The laterally directed bight portion 22 has one end integral with and joined to the left hand leg or limb 18 (see FIG. 4) by way of a coil providing another eye 24 for the fish hook 26. The lower end of the right limb is bent upon itself to provide an eye at 28 to accommodate the hook 30 and the free terminal end portion is bent as at 32 to provide a keeper finger 34 which is directed upwardly and bears against the lower portion of the adjacent limb 18. The free end of the bight portion is bent upon itself as at 36 to provide a loop-like latch or catch 38 which is releasably engageable with the keeper 34. The manner in which the latch and keeper cooperate separably is brought out in full and dotted lines in FIG. 4. It will also be evident that bait having an aperture therethrough may be threaded on the bight portion 22 in the manner indicated in dotted outline in FIG. 2.

Experience in using the invention many times for trotline fishing has repeatedly shown that by baiting the latching catch or clamp (22, 36 and 38) and using the device in the manner illustrated the attached bait will remain securely in place and effectively attract the potential victim and one or more of the hooks will come into play to land he fish. By keeping the hooks close together and yet in a position whereby they are not likely to tangle with each other the coils constitute an effective fish holding means.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. For use on a trotline, a bait support and fishhook holder comprising an elongated one-piece wire frame having an eye at an upper end, a pair of opposed limbs median portions of which are provided with coils defining fishhook attaching eyes, fishhooks having shanks provided with eyes pivotally linked to said hook attaching eyes, a lower end of one limb having a coiled eye to which the eye of a third fishhook is linked and pivotally connected, said lower end having a laterally directed extension provided with a latching member, the lower end of the other limb having a coil defining an eye and terminating in an upstanding finger providing a keeper with which said latching member is releasably connectible, said extension also providing a bait holder.

2. A fishhook and bait holder comprising a wire frame including an inverted V-shaped upper portion embodying upwardly converging limbs connected together by a coil, said coil providing an eye for a tie line, a lower portion generally U-shaped in side elevation and embodying limbs connectible at their lower ends by a lateral bight portion, the upper ends being joined to the lower ends of the first named limbs through the medium of coils, said coils providing eyes adapted to permit the attachment thereto of fishhooks, one end of said bight portion being joined to a lower end of one of said second named limbs through the medium of a resilient coil, the other end of said bight portion being free and terminating in a loop and constituting a latch, said last named coil providing an eye for the attachment thereto of a fishhook, the lower end of the other of said second named limbs being free and having a coil providing a fishhook attaching eye, said coil having an upwardly directed free terminal portion providing a keeper finger, and said loop being separably connectible with said keeper finger.

3. The structure defined in claim 2, and in combination, fishhooks having shanks terminating in eyes pivotally attached to the respective coils on said frame.

References Cited in the file of this patent

UNITED STATES PATENTS

| 772,807 | Ketchum | Oct. 18, 1904 |
| 2,162,739 | Mindek | June 20, 1939 |
| 2,492,638 | Hickson | Dec. 27, 1949 |

FOREIGN PATENTS

| 23,217 | Great Britain | 1893 |